US010341229B2

(12) United States Patent
Sabella et al.

(10) Patent No.: US 10,341,229 B2
(45) Date of Patent: Jul. 2, 2019

(54) METHOD AND APPARATUS FOR CONFIGURING OPTICAL NETWORK NODES

(71) Applicant: Telefonaktiebolaget LM Ericsson (publ), Stockholm (SE)

(72) Inventors: Roberto Sabella, Pisa (IT); Francesco Di Michele, Pisa (IT); Paola Iovanna, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 322 days.

(21) Appl. No.: 15/027,070

(22) PCT Filed: Oct. 4, 2013

(86) PCT No.: PCT/EP2013/070734
§ 371 (c)(1),
(2) Date: Apr. 4, 2016

(87) PCT Pub. No.: WO2015/049013
PCT Pub. Date: Apr. 9, 2015

(65) Prior Publication Data
US 2016/0241468 A1 Aug. 18, 2016

(51) Int. Cl.
*H04L 12/721* (2013.01)
*H04J 14/02* (2006.01)
(Continued)

(52) U.S. Cl.
CPC ............ *H04L 45/62* (2013.01); *H04J 14/021* (2013.01); *H04L 45/125* (2013.01); *H04L 45/70* (2013.01); *H04W 88/085* (2013.01)

(58) Field of Classification Search
CPC ........ H04W 84/18; H04L 41/12; H04L 45/02; H04L 45/00; H04L 45/04; H04L 41/04
See application file for complete search history.

(56) References Cited

U.S. PATENT DOCUMENTS

2013/0089336 A1* 4/2013 Dahlfort .......... H04B 10/25759
398/115
2013/0322451 A1* 12/2013 Wang .................... H04L 45/306
370/392
(Continued)

FOREIGN PATENT DOCUMENTS

| EP | 1 705 839 | 9/2006 |
| EP | 2 439 879 | 4/2012 |
| WO | WO 2008/092069 | 7/2008 |

OTHER PUBLICATIONS

International Search Report for International application No. PCT/EP2013/070734—Jun. 30, 2014.
(Continued)

*Primary Examiner* — Marcus Smith
*Assistant Examiner* — Prenell P Jones
(74) *Attorney, Agent, or Firm* — Baker Botts, LLP

(57) ABSTRACT

A method of configuring optical network nodes (6a, 6b) between a plurality of Remote Radio Units (4a, 4b) and at least one Baseband Unit (2a, 2b). The method comprises monitoring a bandwidth demand of each Remote Radio Unit (4a, 4b), and calculating a routing configuration of the nodes to connect at least one Remote Radio Unit on a tree arrangement to a said Baseband Unit. The calculating (82) the routing configuration is based on at least one connection requirement between the Remote Radio Units and the Baseband Units and the bandwidth demand of each Remote Radio Unit. The method further comprises dynamically configuring one or more optical network nodes to adapt the routing configuration from a said Remote Radio Unit to a said Baseband Unit, according to the calculated routing configuration.

14 Claims, 7 Drawing Sheets

(51) Int. Cl.
*H04L 12/729* (2013.01)
*H04W 88/08* (2009.01)

(56) References Cited

U.S. PATENT DOCUMENTS

| | | | | |
|---|---|---|---|---|
| 2014/0031049 A1* | 1/2014 | Sundaresan | ........... | H04W 16/02 |
| | | | | 455/447 |
| 2015/0304921 A1* | 10/2015 | Hong | ................... | H04W 36/08 |
| | | | | 455/436 |
| 2016/0134455 A1* | 5/2016 | Agee | ................... | H04B 7/0413 |
| | | | | 370/330 |

OTHER PUBLICATIONS

Placement of Base-Band Units (BBUs) Over Fixed-Mobile Converged Multi-Stage WDM-PONs by Nicola Carapellese et al.; Brest, France—2013.

Mobile Backhaul for Small Cells; Centralized Radio Access Networks Over Wavelength- Division Multiplexing: A Plug-and-Play Implementation by Filippo Ponzini et al.; IEEE Communications Magazine—Sep. 2013.

* cited by examiner

METHOD AND APPARATUS FOR CONFIGURING OPTICAL NETWORK NODES

PRIORITY

This nonprovisional application is a U.S. National Stage Filing under 35 U.S.C. § 371 of International Patent Application Serial No. PCT/EP2013/070734, filed Oct. 4, 2013, and entitled "A Method And Apparatus For Configuring Optical Network Nodes."

TECHNICAL FIELD

Aspects of the invention relate to a method and apparatus for configuring optical network nodes. The optical network nodes are between a plurality of Remote Radio Units and at least one baseband hotel.

BACKGROUND

A traditional radio access network (RANs) consist of many individual stand-alone base stations, each having an antenna, equipment for transmitting and receiving radio signals (radio frequency part) and data processing equipment. The base stations are connected to a local exchange in the case of GSM and UMTS mobile systems, or directly to the service gateway and Mobility Management Entity for user and control planes respectively, of the core network in the case of a LTE network. This means that each base station needs an individual backhaul transportation, as well as further systems such as cooling, back up battery, monitoring system.

A recent approach is centralization of radio base stations, in which a radio frequency part and processing equipment of the radio base station are split in two parts and placed in different sites. Processing equipment, termed a digital unit (DUs) is located in a common site, e.g. termed a baseband hotel. The DU offers processing resources for multiple radio cells. The radio frequency part is formed by the radio termination and by the antennas, and may be termed Remote Radio Units (RRUs).

Even though the typical average traffic load in a base station is comparatively low, the functions of the based station are often dimensioned for peak traffic. The utilization rate is low because the average network load is often far lower than that in peak load, due to fluctuations and burstiness of mobile traffic with time. Therefore, the network is overprovisioned in order to handle peak load at each base station.

In some examples, mobile traffic in a business area during the working hours can be greater than evening time; while in residential areas traffic peaks may occur during the evening. During working hours, a part of mobile backhaul which serves the business area is heavily loaded, while a part which serves the residential area is under loaded. During evening time, traffic peaks move to residential area, so the part of the mobile backhaul which serves this area is heavily loaded or overloaded, and the part related to business is under loaded. The resulting need for overprovisioning of entire network resources results in an inefficient use of resources.

SUMMARY

A first aspect of the present invention provides a method of configuring optical network nodes between a plurality of Remote Radio Units and at least one Baseband Unit. The method comprises monitoring a bandwidth demand of each Remote Radio Unit, and calculating a routing configuration of the nodes to connect at least one Remote Radio Unit on a tree arrangement to a said Baseband Unit. The calculating the routing configuration is based on at least one connection requirement between the Remote Radio Units and the Baseband Units and the bandwidth demand of each Remote Radio Unit. The method further comprises dynamically configuring one or more optical network nodes to adapt the routing configuration from a said Remote Radio Unit to a said Baseband Unit, according to the calculated routing configuration.

Thus, examples of the invention provide for a decrease of the overprovisioning of network resources and/or provide for efficient mobile backhauling.

A second aspect of the present invention provides an apparatus arranged to determine a configuration of optical network nodes between a plurality of Remote Radio Units and at least one Baseband Unit. The apparatus comprises an input interface arranged to receive monitoring information of a bandwidth demand of each Remote Radio Unit. The apparatus further comprises a calculation unit configured to calculate a routing configuration of the nodes to connect at least one Remote Radio Unit on a tree arrangement to a said Baseband Unit. The calculation unit is configured to calculate the arrangement based on at least one connection requirement between the Remote Radio Units and the Baseband Units and the bandwidth demand of each Remote Radio Unit. The apparatus further comprises an output interface arranged to output the calculated configuration to dynamically configure one or more optical network nodes to adapt the routing from a said Remote Radio Unit to a said Baseband Unit.

A third aspect of the present invention provides a computer program product, configured when run on a computer to conduct a method according to any aspect of the invention.

BRIEF DESCRIPTION OF THE DRAWINGS

Embodiments of the present invention will now be described, by way of example only, with reference to the accompanying drawings in which.

DETAILED DESCRIPTION

Figure 1:
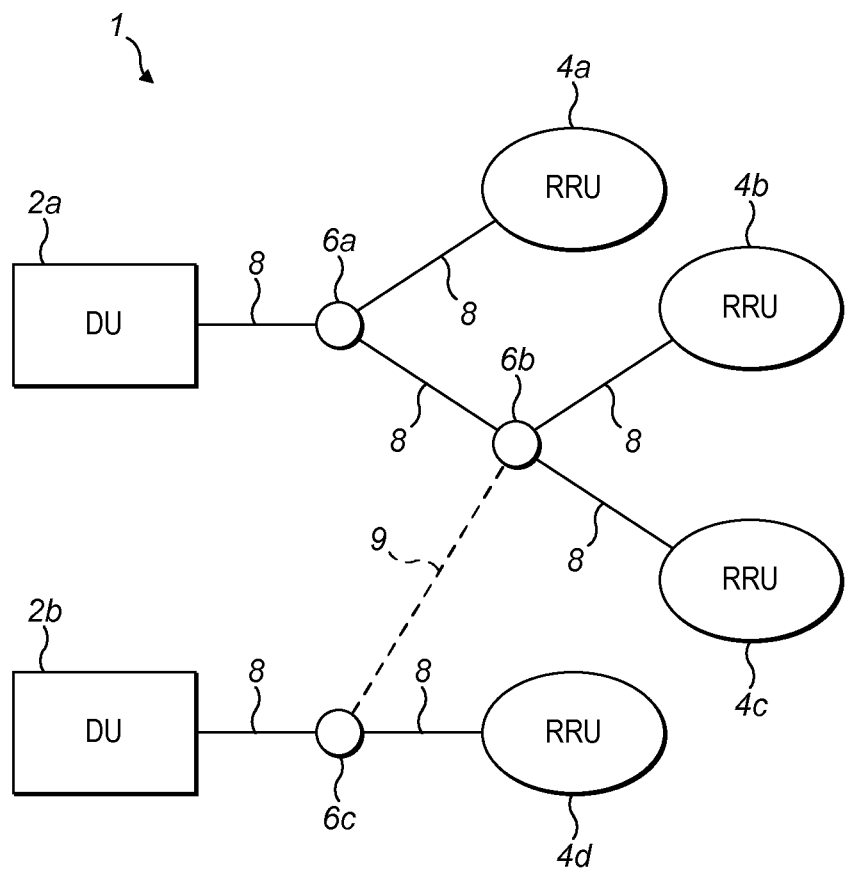
FIG. 1 shows an example of a network according to an example of the invention.

FIG. 1 shows an example of a connection topology configured according to an embodiment of the present invention. The example front-haul network 1 comprises a plurality of DUs 2a,2b. The DUs 2a,2b are connected to a plurality of RRUs 4a,4b,4c,4d. The DUs and RRUs are connected by one or more links 8 and one or more nodes 6a,6b,6c. The links 8 extend between two of: an RRU, a node and a DU. In some examples, the links 8 may extend between two RRUs or between two nodes. The connections between the RRUs and DUs is an optical connection. The links 8 and nodes 6a,6b,6c are optical links and optical nodes.

At least some of the nodes 6a,6b,6c are reconfigurable. For example, at least some the nodes 6a,6b,6c are reconfigurable optical add-drop multiplexers (ROADMs). The links 8 shown are examples of selected or active links or connections. Further physical links may exist, but are not selected by the current method. Aspects of the invention may also configure the nodes 6a,6b,6c to provide a determined capacity or number of paths for each RRU. Examples of the present invention are arranged to configure the arrangement of the connections and the bandwidth assigned to each connection.

In the example network 1 shown, a tree topology or tree configuration is configured between RRUs 4a,4b,4c and DU 2a. The tree topology comprises nodes 6a,6b. Aspects of the invention may determine an optimal routing configuration comprising a tree configuration.

A further node 4d is determined to be optimally connected to a different DU 2b. The node 4d is not connected in a tree topology, but as a point-to-point connection. The point-to-point connection may be through one or more nodes, in this example, through node 6c. The point-to-point connection is a connection of an RRU which does not share a link of its connection with another RRU which is connected to the same base band hotel.

The point-to-point connection may include one or more node, e.g. node 6c. The node in the point-to-point connection may support further links, e.g. links of a tree topology.

A further link 9 shows an alternative connection between node 6b and node 6c. The method has determined that using link 9 to connect RRUs 4b,4c to node 6c and DU 2b is not the optimal connection. Thus, the configuration of a tree comprising RRUs 4b,4c,4d is not optimal, and not selected. Instead, a tree comprising RRUs 4a,4b,4c and a point-to-point connection for node 4d is considered optimal.

The calculation of the optimal trees and point-to-point connections are described in more detail below.

In some examples, the communication between DU and RRU is realized using a Common Public Radio Interface (CPRI) protocol. The CPRI protocol is a specification for an interface between the radio equipment control (REC) or DU and the radio equipment (RE) or RRU in wireless base stations. CPRI allows the use of a distributed architecture where base stations, containing the REC or DU, are connected to remote radio heads via fibre links that carry the CPRI data. The baseband hotel may alternatively be termed the radio equipment control and/or the RRU may alternatively be termed the radio equipment. The baseband hotel may alternatively be termed a Baseband Unit.

The communication protocol between the RRU and baseband hotel may specify one or more of transport, connectivity and control, optionally including user plane data, control plane transport mechanisms, and synchronisation. The communication protocol may apply to Layers 1 and 2 of the Open Systems Interconnection (OSI) stack. The physical layer (layer 1) supports an optical interface. In the case that the communication protocol is CPRI protocol, aspects of the invention may calculate connections which conform with CPRI Specification version 5.0.

The baseband hotel (REC) provides functions including one or more of: network interface transport, radio base station control and management, and digital baseband processing. The RRU (RE) provides functions including one or more analogue and radio frequency functions, e.g. filtering, modulation, frequency conversion and amplification.

Examples of the invention relate to configuring of network nodes to connect a plurality of RRUs with a baseband hotel (or DU). Examples of the invention define the structure of the network connections between the RRUs and the baseband hotels. At least some of the RRUs are connected in a tree topology with a baseband hotel. Examples of the invention specify how the tree topology is calculated in order to optimally connect the RRUs to the baseband hotel. The optimal connection meets the specific requirements, e.g. of CPRI, in connecting RRUs to a baseband hotel.

Aspects of the invention may calculate the network configuration for a single baseband hotel. Alternatively, the calculation may be for a plurality of baseband hotels. Aspects of the method consider different baseband hotels to connect to an RRU and/or moving the RRU to another baseband hotel.

The terms DU and baseband hotel will be used interchangeably in the specification. Any reference to a DU may alternatively refer to baseband hotel, and any reference to baseband hotel may alternatively refer to a DU.

Figure 2:
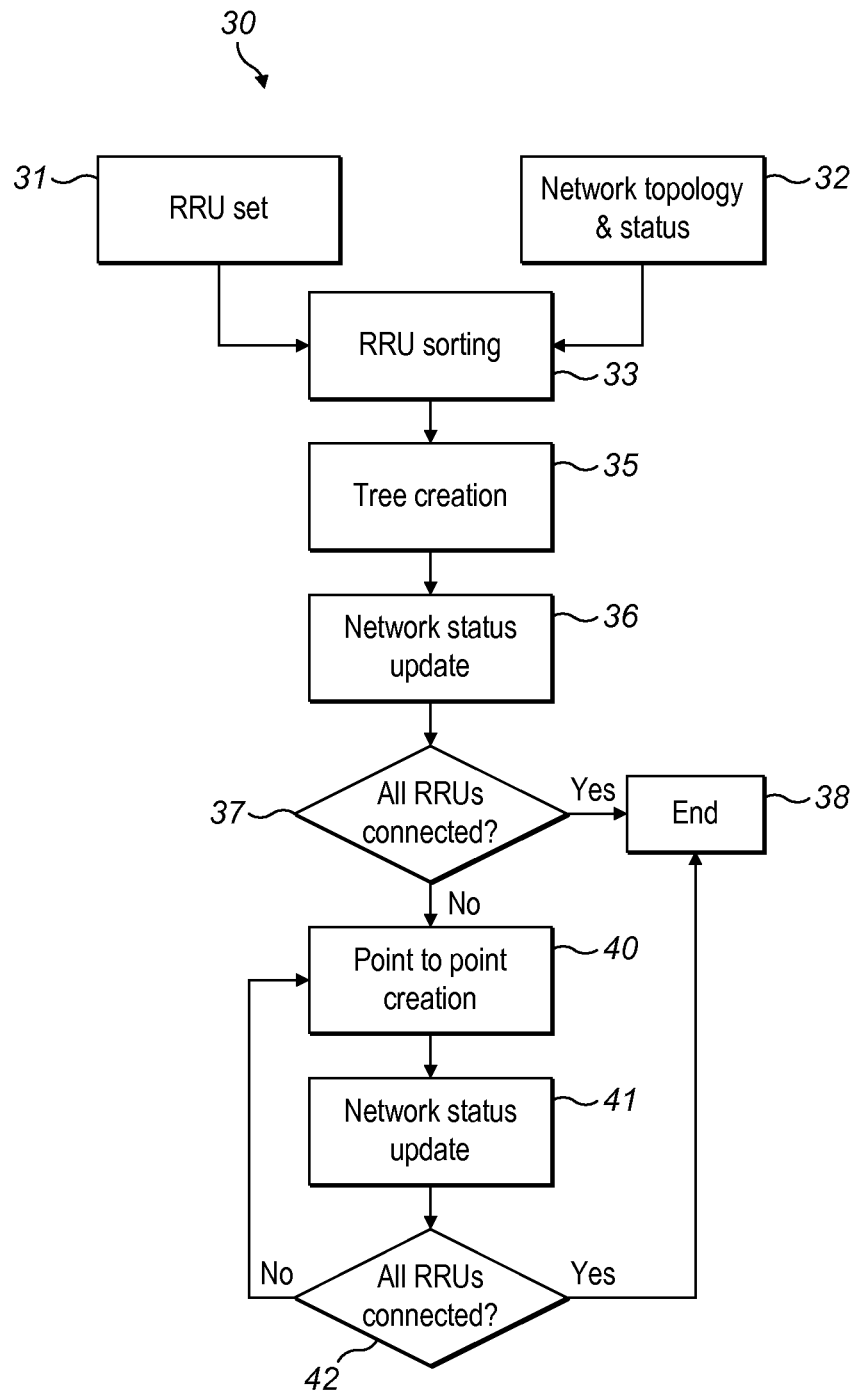
FIG. 2 shows a flowchart illustrating steps according to an example of the invention.

FIG. 2 shows an overview of a method 30 according to an example of the present invention. The method 30 receives input information defining a set of RRUs 31 which are to be attached to a DU, e.g. located in a baseband hotel or located in another baseband hotel. The information is a RRU traffic demand (traffic matrix of the problem). The method 30 also receives as input information defining a current network topology and status 32. In some aspects, this information is the trees computed to the previous step. Examples of the invention are configured to build-up trees considering iteratively these two inputs 31,32.

In some aspects the method, step by step, builds up a tree where the demands of a subset of RRUs will be routed. The RRUs share the same baseband hotel. The method of the examples of the invention is arranged to increase each generated tree in order to serve more RRUs.

In an optional step, the method comprises RRU sorting 33. In case of a set of RRUs which will be re-configured, the method sorts, according to one or more ordering criteria, the RRUs to be connected with the same baseband hotel.

For instance an ordering criterion can be the physical distance between a RRU and the related hotel. The more distant RRU are considered first. Then the RRUs that can be hung on the same tree towards the baseband hotel are aggregated in order to minimize the number of branch of each tree. This phase is optional, e.g. in case just one RRU is involved and/or real time re-configuration is required. If the computational time is very fast; the sorting procedure may be applied.

The RRU sorting 33 may additionally or alternatively take into account the link availability of a RRU's node and/or the RRU bandwidth requirement. The less connected (in terms of outgoing RRU node's links) RRUs are considered to be connected first or as a priority. The RRUs supporting more traffic than others are connected as a priority. The objective of this phase is to maximize the number of RRUs to be connected, by considering first the RRUs that are less possible as trees to be used to reach a baseband hotel.

The method 30 comprises a tree creation step 35. In this step, the method tries to create a new tree or increase an existing tree. In order to choose the best connection for the RRU to move to, the method evaluates both types of tree solutions, i.e. creating a new tree and increasing an existing tree. By considering both of these tree solutions, the method 30 is able to find the better solution.

A network status update is provided in step 36. The network status update reserves the network resources for the trees computed previously.

In 37, the method determines if all the RRUs are connected. If all the RRUs are connected, the method 30 is finished, since the objective of connecting all RRUs is completed. The method 30 then ends 38.

If the method determines that at least one RRU cannot be connected as part of a tree topology, the method 30 connects the remaining RRUs with point-to-point connections. The point-to-point connections are created in step 40. The point-to-point connection can be considered a tree made of a single path. The RRUs which cannot be connected to a baseband hotel by a tree are connected by a point-to-point connection. A network status update is provided in step 41. The network status update reserves the network resources for the trees computed previously.

In 42, the method determines if all the RRUs are connected, by either a tree or a point-to-point connection. If at least one RRU is not yet connected, the method returns to step 40, and determines a point-to-point connection for an unconnected RRU. If the method determines that all the RRUs are connected, the method ends 38.

Examples of the invention relate to a CPRI centralized RBS scenario based on fully reconfigurable optical nodes. A routing and bandwidth assignment can be varied according to aspects of the invention to well-balance the network loading, e.g. in order to decrease the overprovisioning of entire network resources. Aspects of the invention provide routing and bandwidth allocation dynamically in a CPRI centralized RBS scenario. Examples of the present invention provide for efficient mobile backhauling and dynamic routing. The current traffic may be monitored, and used in the analysis to provide for dynamic updating. Based on the monitoring of the current traffic, the routing of traffic from an RRU may be changed, e.g. the network comprises a different configuration of tree, comprises (or removes) a point-to-point connection, and/or routes traffic to a different baseband hotel or DU.

Examples of the invention are an active optical metro network, e.g. which is able to dynamically reconfigure connections between RRUs and baseband hotel satisfying the CPRI synchronization requirements (e.g. delay). The reconfiguring of the connections (i.e. nodes) is according to traffic fluctuations. Examples provide for front hauling, defining routing and allocating bandwidth, in order to efficiently use resources. The bandwidth may be allocated dynamically, e.g. whenever the traffic load changes.

Examples of the invention are able to compute new paths, optionally including a protected path if required. The computed paths are from a RRU set, which can be composed by one or more elements, to the related baseband hotel(s). Aspects of the invention are arranged to adjust the bandwidth assignment taking into account the previous network loading. The method of reconfiguring the optical network in a tree topology between RRUs and DUs allows management of traffic fluctuations in a simple, efficient and scalable way.

In some examples, an initial condition of the method is a network where all RRUs are connected to the related baseband hotels, and the network is loaded with their bandwidth requests. Whenever one or more RRU is advantageously connected to another DU, located in a different baseband hotel, the method according to an example of the invention starts to run. The inputs are the set of RRU to be connected, the network status and topology. Examples of the method calculate the tree topology, or connections, between the RRU and DU in order handle the traffic fluctuations.

In some examples, a set of RRU is to be moved from old baseband hotel to a new one, the method tries to connect such RRUs to the new hotel increasing an existent tree. In case the tree cannot be augmented the solution creates one or more new trees. In case of only one RRU, such tree is a point to point connection. The method verifies delay requirements to allow connection constraints, e.g. CPRI, working properly taking into account both the distance and the delay each node can provide.

Once the trees connecting the RRUs and the related Baseband hotel are designed, the method allocates the required bandwidth, taking into account the existent network loading, and routes the demand on the tree previous computed.

Figure 3:
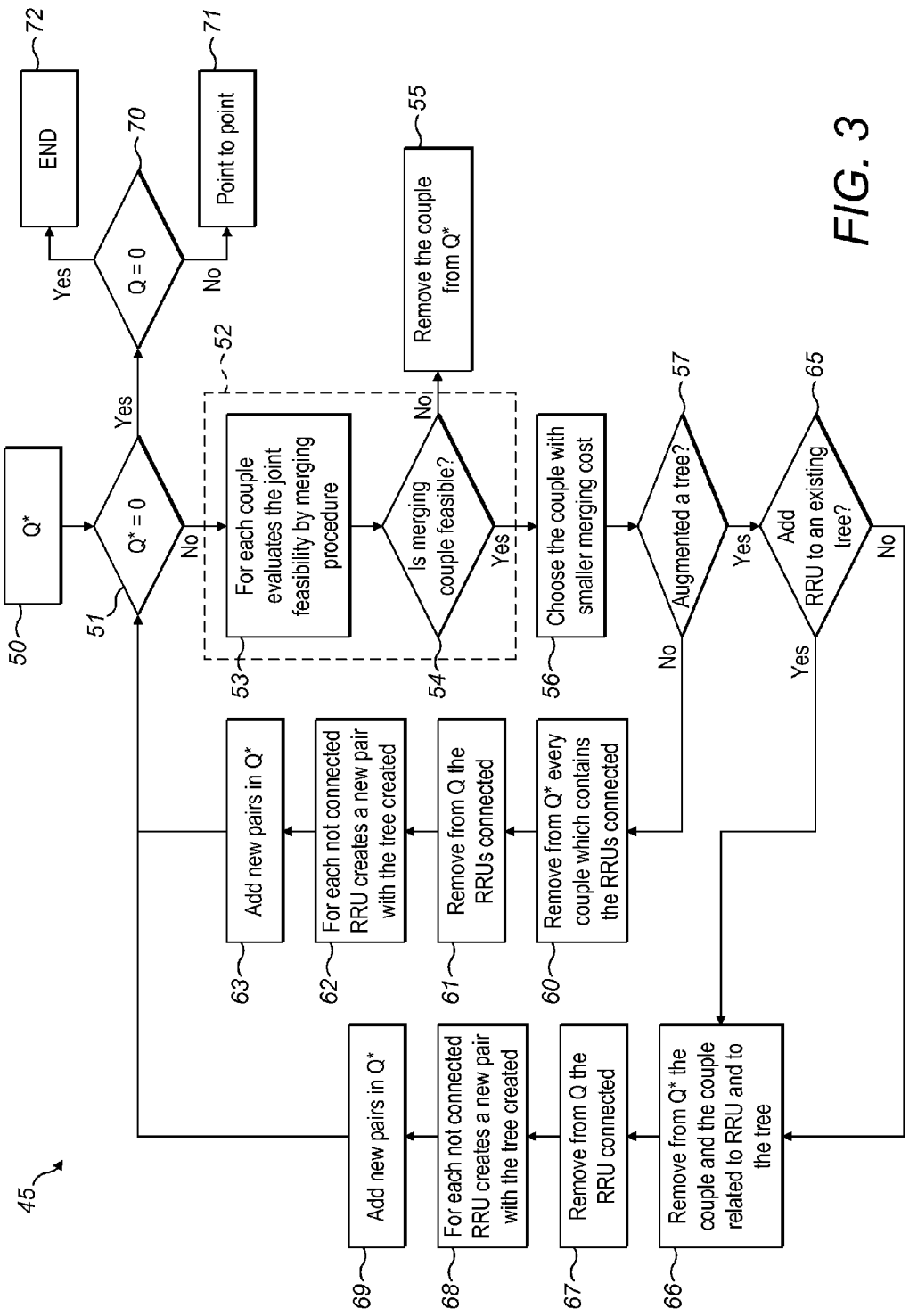
FIG. 3 shows a further flowchart illustrating steps according to an example of the invention.

FIG. 3 shows further details in a method 45 of the calculation of the network configuration, including the tree creation in step 35 above. The method selects the best tree to serve the RRU. The method comprises an evaluation of augmenting an existing tree and which is the best tree to augment, or if it is better to provide a new tree between the RRU analysed and another RRU to be connected.

The method 45 comprises performing a search on all possible couples of demands in order to consider the best choice. The method analyzes all possible couples of demands one by one. The couple of demands may be from an RRU and a tree, and/or the couple of demands may be from two RRUs. This step is performed by analyzing only feasible tree, in terms of required connection restraints (e.g. CPRI) and bandwidth constraints. By only analyzing feasible trees, the computation time may be reduced. The advantage of this method is to give a solution before an exhaustive analysis of the entire space of the solution. The feasibility is checked during the tree creation, as described below.

A merge procedure (described further below), which is a subroutine of the tree creation 35, tries to build up a tree and checks distribution constraints (e.g. CPRI constraints) and bandwidth constraints. Once the merge procedure is ended the solution has two behaviours: remove from the set the analysed couple, if building up the tree is not possible or evaluate the merging cost, if it is possible. The method of building a tree by checking CPRI and bandwidth constraints allows an efficient generation of a network configuration. The method checks each combination of demands, e.g. each node of a tree to attach a RRU for feasibility, before computing the cost.

In 50, the method receives pairs (or couples) of demands. The demands of each pair share the same destination, although different pairs may have different destinations.

In 51, the method determines whether the number of pairs of demands has been reduced to zero, i.e. all pairs analyzed. If there are further pairs to analyze, the method continues with a determination 52 of the joint feasibility.

The determination 52 comprises an evaluation 53 of the joint feasibility by the merge procedure 53. The step 53 evaluate whether it is feasible to join the pair of demands. The joining of the pair of demands may refer to joining the demand of an RRU with the demand of a tree, or joining two demands of RRUs to form a new tree. The new tree is checked for feasibility.

The merge procedure 53 will try to joint different demands on a common tree. There are two possible cases:

1) Joint two demands on a new tree (and connecting the new tree to an existing tree or directly to a baseband hotel).
2) Add a demand to a tree.

Thus, the method will analyze joining a pair of RRU demands to create a new tree and joining a RRU demand with an existing tree or a newly calculated tree.

Step 54 determines if it is feasible to join (merge) the demands. If it is not feasible, the pair of demands are removed 55 from the set of demands Q* to be analyzed. The method then returns to steps 50 and 51.

If the demands are considered feasible to be joined, the method evaluates the optimal merge, e.g. in terms of a cost of the merge in 56. The cost of the merge may be based on the physical length of the resultant tree and/or one or more other parameters. The tree resulting from the merging of the couple of demands which has the smaller merging costs is selected. For example, couples of demands comprising the same RRU or trees are compared to determine the optimal one, e.g. having smallest merging cost. In some examples, the selection 56 the optimal couple of demands to merge to form the tree configuration is a part of the determination 52.

The method 45 continues by updating in an updating phase the set of all the demand couples. This procedure comprises the following general steps. Remove from the set all the couples including RRUs or the existent tree belonging to the smallest merging cost couple. Remove from the list of the RRUs to be connected the RRUs just served. Create a new combination of demands between the RRUs to be served and the tree chosen. The updating phase allows reducing the solutions to be analysed in order to reduce the computation time of the method.

In order to explain aspects of the invention, the following definitions are used:

G=(V,E) is the undirected graph representing the real mobile front-hauling networks.

This is the network topology.

V is the entire network node set; it represents the physical node set of the network.

This includes nodes/switches/routers, RRUs, and baseband hotels.

E is the entire network edge set; it represents the physical links set of the network.

S is a subset of V representing the fixed Baseband hotel; it represents the subset of physical nodes where the baseband hotels are hosted. s is a baseband hotel (or DU) being analyzed.

D is the set representing RRU sites to be connected. d is an RRU being analyzed.

This can be a subset or the entire V; and represents the subset of the physical nodes where the RRUs are hosted.

Q Is the entire set of demands; each Q element represents the required connectivity between a RRU to be moved and a suitable baseband hotel. Q is defined by a triple: source, belonging to S, destination, belonging to D and the required bandwidth. Q represents the traffic matrix of the requests, each Q is a traffic demand.

Q' Is the set of demands originated from an existent connection; each Q' element represents the sum of working RRU bandwidth requests. Q' represents the bandwidth of the trees that are configured in the network.

Q* is the set of pairs of demands originated from the union of Q and Q' which share the same destination (not necessarily the same for all pairs).

Q" is the set of original demands not connected from the tree creation phase.

Q''' is the set of traffic demands of RRUs of the tree that must be analysed for feasibility.

q is a subset of demands from Q that share the same destination of demands from Q, q(T) or q(T') are for a tree T or T'.

$q_h$ is the set of demand all RRUs that must be connected to the same DU, but are not connected yet (i.e. the tree must be determined).

T' is a tree; it represents the existent connection between a subset of RRU, belonging to D, and the related baseband hotel, belonging to S. It represents an already configured tree in the network.

T is a tree; it represents the new connection between the old subset of RRU increased by new RRUs to connect, belonging to D, and the related baseband hotel, belonging to S. It represents the new tree generated from the method. T can be composed by an existent tree (i.e. T'), augmented by RRUs to be served or a new tree formed only by the RRUs to be served.

Γ is the set of trees which connects the entire subset of RRUs and the fixed baseband hotel. It represents the set of trees that share the same Baseband hotel.

A Pair or couple refers to the traffic demands of a first and second RRU or a couple defined by the combination of an RRU and a tree. The term edge refers the links of the network topology $S_q$ is the node of the network which is the source of the traffic demand of the traffic matrix.

Pu is the path that connects a RRU to a node of the tree. Pu* is the best path that connects a RRU to a node of the tree.

u is the generic node of the tree where the RRU can be connected. u* is the best node among all possible "u" nodes of the tree.

The traffic demands of each RRU will be termed original demands. The existing trees which can be increased to include other RRUs during the iterative steps of the method will be termed artificial demands.

The method, step by step, builds a set Γ of trees which will be called routing trees; Each tree T, belonging to Γ, will be used to route a subset q(T) of demands from Q that share the same destination. For a given T, belonging to Γ, the set q(T) will grow through the iterations, as the method will try to add more demands to the tree.

The creation of a tree may be considered as joining a pair of original demands creating a new tree, or join a pair {q,q(T) or q(T')} with q an original demand and q(T) or q (T') an artificial one, by extending the tree T as to include q.

The method 45 is configured to build-up trees considering iteratively two inputs: i) the RRU traffic demand (the traffic matrix of the problem) and ii) the trees computed to the previous step.

In 57, a determination is made of whether the selected couple of demands are augmenting a tree. If the determination is no (i.e. a new tree is determined), the method continues with step 60. This determination may alternatively be expressed as the pair in Q* with the smallest merging cost is a pair of original demands and T is the corresponding routing tree, with artificial demand q(T).

The updating phase is slightly different between a new tree case (steps 60-63) and the augmenting of an existent tree (steps 66-69), as will be described below.

In step 60, the method comprises removing from the set Q* all pairs where all the RRUs connected are contained. This step removes from Q* each pair of demand containing either original demand.

In step 61, the method comprises removing from Q the original demands. This removes from the list of RRUs the RRU connected.

In step 62, for each not connected RRU, the method comprises creating a new couple (pair) of demands with the tree just created. This provides for unconnected RRUs to be connected with the tree created in a previous iteration of the method.

In step 63, the method comprises adding to the list all new pairs generated in step 62, i.e. between the smallest merging cost tree and RRUs yet to be connected which share the destination with the tree. Thus, couples of demands may be calculated between unconnected RRUs and the configuration of RRUs which have just been connected. This may be expressed as, for each $q_h$ in Q which share the same destination of T, add the pair $\{q_h, q(T)\}$ to Q*.

If the determination in 57 is that the selected couple of demands is an augmentation of a tree, the method evaluates whether the tree is an existing tree in 65. The same steps are carried out for either an existing tree T' (termed an artificial demand) or a calculated tree T (original demand). The difference is merely in which type of tree is used in the following steps. Both existing connection and new connection trees will be generically referred to as trees in the following.

The new connection tree (RRU is not connected to an existent tree) is applicable if the pair in Q* with the smallest merging cost is a pair $\{q, q(T)\}$, where the first demand is an original one and the second is an artificial one and T is the corresponding routing tree, with artificial demand $q(T)=q \cup q(T)$.

An existent connection tree (RRU is connected to an existent tree) is applicable if the pair in Q* with the smallest merging cost is a pair $\{q, q(T')\}$, where the first demand is an original one and the second is an artificial one, representing an existent connection and T is the corresponding routing tree, with artificial demand $q(T)=q \cup q(T')$.

In step 66, the method comprises removing from the list all pairs where the RRU connected and the tree is contained. For the new connection tree, this may be defined as removing from Q* each pair of demand containing either q or q(T). For the existing connection tree, this may be defined as removing from Q* each pair of demand containing either q or q(T').

In step 67, the method comprises removing from Q the original demands. This removes from the list of RRUs the RRU connected. For the new and existing connection, the method removes from Q the original demand q.

In step 68, for each not connected RRU, the method comprises creating a new couple (pair) of demands with the tree just created. This provides for unconnected RRUs to be connected with the tree created in a previous iteration of the method.

In step 69, the method comprises adding to the list all new pairs generated in step 68, i.e. between the smallest merging cost tree and RRUs yet to be connected which share the destination with the tree. Thus, couples of demands may be calculated between unconnected RRUs and the configuration of RRUs which have just been connected.

For the new connection tree, this may be defined as: for each $\{q_h\}$ in Q which share the same destination of T add the $\{q_h, q(T)\}$ to Q*. For the existing connection tree, this may be defined as: for each $\{q_h\}$ in Q which share the same destination of T' add the $\{q_h, q(T')\}$ to Q*.

As a further action, the method comprises adding the newly calculated tree to the overall list of trees (i.e. add T to Γ). The method further comprises updating the network resources, and allocating the required bandwidth from the RRUs of each tree.

If the determination in 51 is that all pairs of demands have been analyzed, the method considers in 70 whether any RRUs are remaining to be connected. For any remaining RRUs, a point-to-point connection is calculated in 71. Point-to-point connection is described in more detail below. When no further RRUs require a connection to be calculated, the method ends 72.

Examples of the invention consider if it is better to augment an existing tree and which tree is the best for that, or if it is better to provide a new tree connection. Thus, the connection of an RRU with both an existing tree and a new tree is analysed. The method analyses all possible combinations in order to consider the best solutions. In order to reduce computation time, the feasibility of each tree is performed during tree creation.

The method reduces the number of possible combination to analyse. The sequence is to create in each step a new couple of sources to be connected comprising a RRU and RRUs already combined in a tree. When the final tree is selected, the list of possible candidate sources is pruned, eliminating all couples where the RRU is already accommodated, and the correspondent RRU-trees. Updating of all possible combination is realized subsequently to the smaller merging cost being selected. In order to limit the set of possible trees to be analysed, aspects of the invention concurrently considers the connection constraints (e.g. CPRI constraints). Thus, the method analyses only compliant trees.

Figure 4:
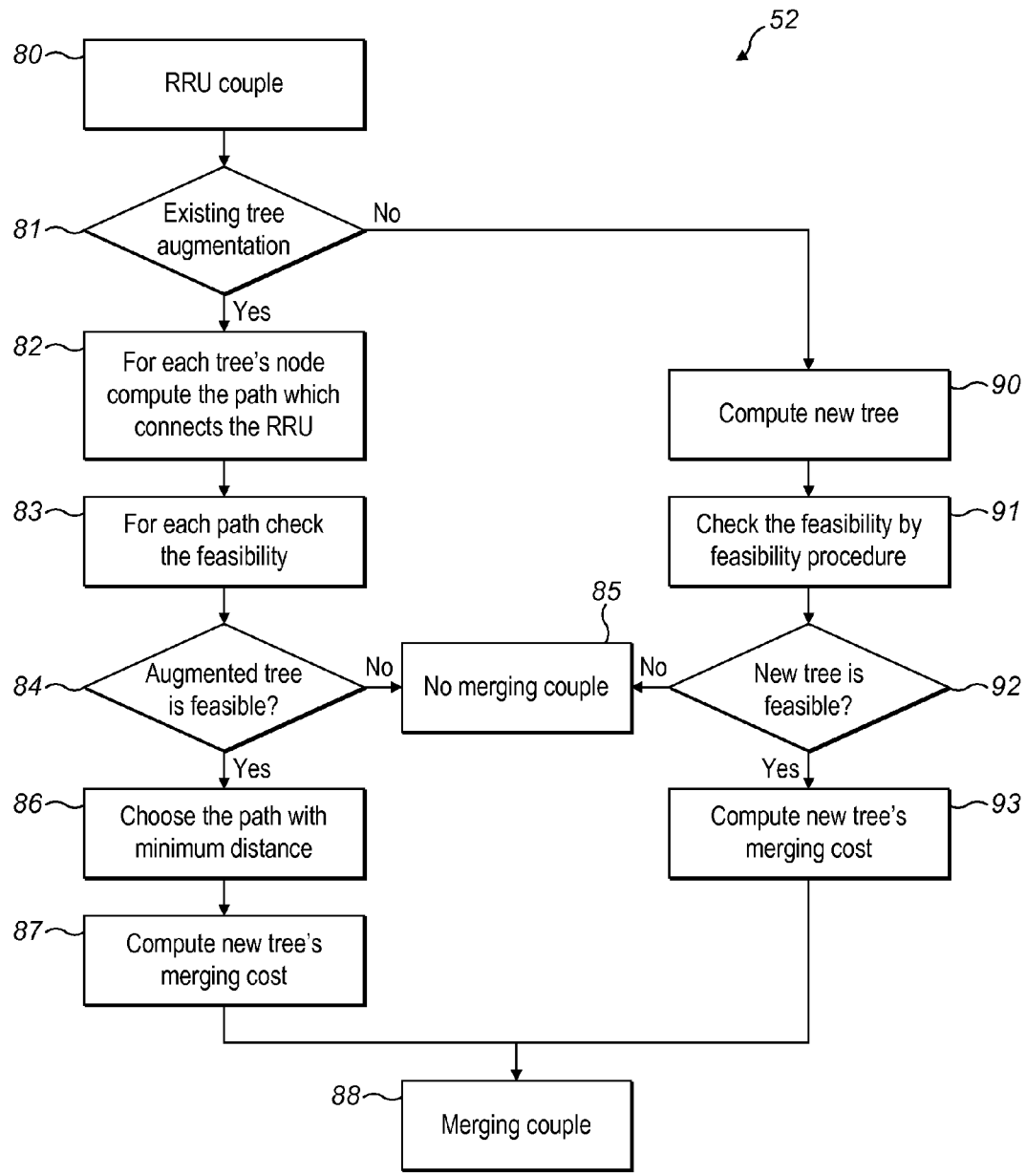
FIG. 4 shows a flowchart illustrating steps according to an example of a part of the invention.

FIG. 4 shows further details of the determination 52 of the joint feasibility, which may alternatively be termed a merging procedure 52. The merging procedure 52 comprises a determination of the feasibility of merging the two demands. The merging procedure 52, which is a subroutine of the tree creation, tries to build up a tree, checks the connection (distribution) constraints, e.g. CPRI constraints, and bandwidth constraints and computes the merging cost, if the tree is created.

Given a pair of demands in 80 (e.g. RRU couple), the merging procedure 52 finds a tree which satisfies the demands, checks the feasibility, selects the optimal tree and calculates the cost of such a tree.

In 81, a determination is made of whether the pair of RRU demands comprises an augmentation of an existing tree.

If the method is for an existing tree augmentation, for each node of the tree, the method comprises computing 82 the path which connects to the RRU. A path to each node of the existing tree is analysed to determine the optimal node, e.g. in terms of distance.

In some examples, all the tree's nodes are analyzed to find the best node u* as where to hang the RRU. The best node, and the relative tree, is chosen building up for each node the tree that connects it with the RRU. In some aspects, for each node of the tree (u) belonging to tree under evaluation (T) the method comprises finding the "best" available path (Pu) from the RRU to the node of the tree (u). Such path (Pu) is the minimum path (e.g. minimum distance path) among all possible paths that can be used to connect RRU to the node of the tree. In this step the method finds the paths between the RRU and a single node belonging to the tree, and selects the path with the minimum distance. This step is repeated for the entire tree's nodes. An optimal path between the RRU and each node is determined.

For each path, the feasibility is checked 83. The feasibility checks that the network configuration meets the connection constraints (e.g. CPRI requirements) and bandwidth constraints. The feasibility is checked as described in more detail elsewhere. In some aspects, the method comprises checking the feasibility of the tree $T_{i,u}=P_u \cup T$, i.e. the union of Pu and T using the feasibility method described in more detail elsewhere in the description. This step is applied for every tree $T_{i,u}$ computed in the point above. In this step the procedure generates a tree hanging the path with minimum distance computed in the previous step to the existent tree and checks the feasibility of this new tree. This step is repeated for the entire tree's nodes. In some examples, the feasibility of only the determined optimal path is checked. Therefore, aspects of the invention consider all paths to all nodes, but the feasibility check is carried out on the optimal path for each node. This may reduce processing requirements.

In 84, a determination is made of whether each augmented tree is feasible. If the augmented is not considered feasible, no merging couple is determined 85 to be possible.

If the augmented tree is considered feasible in 84, the method continues by selecting the path with the minimum distance in 86. The minimum distance may refer to the minimum length of the path between the RRU and baseband hotel. The method selects the tree with minimum total length among the trees generated in the previous steps. The method chooses only between feasible trees. The method chooses among all the feasible trees found in the previous step, the tree $T_{i,u}$ defined by a node u* with minimum distance Pu*. The method selects the node (and relative tree) with minimum distance Pu*. In this step, the procedure selects the tree with minimum total length among the trees generated in the previous steps. The method chooses only between feasible trees.

In 86. at least one cost is considered to select an optimal tree, and in some examples, two (or more) costs are considered:

i) the cost to select the more convenient node of one tree to hang a RRU. In this case a single tree is considered to find out the best node of such tree for hanging the RRU. The distance is one of the main parameters for optimizing a tree. In addition other parameters can be considered.

ii) the cost that allows to select the more convenient tree among several possible trees. In this case all possible trees are analysed to select the best ones. Again the distance is considered, but other parameters can be considered in addition.

In some examples, the tree is assessed according to the depth of the tree. The depth of tree is desired to be minimized. The depth of tree is not the only objective. Aspects of the invention consider the minimization of the depth of tree as one of the objective to be minimized, together with the other constraints. In some aspects, all constraints and parameters are simultaneously considered.

In 87, the method computes the merging cost of the new tree. The merging cost is calculated taking into account the physical total tree length. It is possible to include other parameters in the cost computation. In some examples, the merging cost of the pair is determined to be equal to the cost of the calculated tree, i.e. $T_{i,j}$. If the merging procedure is analyzing joining a pair of demands {q,q(T)}, where the first one is an original demand and the second is an artificial one, it means the routing tree T is extended so that it satisfies the demand q as well. This will be done by enumerating the nodes of T as to choose the best node where to hang a path. In some aspects, the merging cost is determined to be the minimum distance of the path to the best node of the tree. In some aspects, the merging cost of the pair {q,q(T)}, is determined to be equal to the length of Pu*. In this step the procedure computes the merging cost in terms of tree total length.

The couple is determined to be able to merge in 88.

The method described above in steps 81 to 88 is applicable for the connection of an RRU to either an existing tree or a previously calculated tree. For example, the couple to merge is {q,q(T')} where q is an original demand and q(T') is an artificial one representing an existent connection, or, the method applies to joining a pair of demands {q,q(T)}, where the first one is an original demand and the second is an artificial one. The method extends the routing tree T or T' so that it satisfies the demand q as well.

The merge procedure has different behaviour depending on the pair of demands. Such demands can be both original traffic demand (RRUs to be connected), or a combination of RRU and trees, e.g. computed at the previous step of the procedure.

If the couple of demands to be connected are composed by two RRUs, a new tree is required. The solution builds up a new tree in 90 between RRUs and the baseband hotel.

In this case the merging procedure is trying to join a pair of original demands (RRUs), the method sets up a new routing tree in order to satisfy such demands.

The new tree connecting the couple of RRUs and the baseband hotel is founded on the network representation. The method finds on G the best tree connecting, in terms of minimum total length, the original demands with the related destination. In some examples such a tree is found by an algorithm for a Steiner tree problem. Such a tree may be termed $T_{i,j}$, for RRU demands i and j. The method generates the tree topology connection between RRUs to connect and the baseband hotels.

In 91, the method checks the feasibility. The feasibility of $T_{i,j}$ is checked with respect to the original demands using the feasibility procedure, e.g. checking the feasibility in terms of CPRI and bandwidth constraints, described in more detail elsewhere.

In 92, the method determines if the new tree is feasible. If the tree is feasible, the method computes 93 the new merging cost. The merging cost is calculated taking into account the physical total tree length. It is possible to include other parameters in the cost computation. The merging couple is determined to be able to merge in 88.

If the combination is composed by a RRU and a tree, an existent tree is considered to be augmented. The method searches the best node of the existent tree to hang the RRU to create a new tree. The method checks the feasibility and computes the new merging cost.

Figure 5:
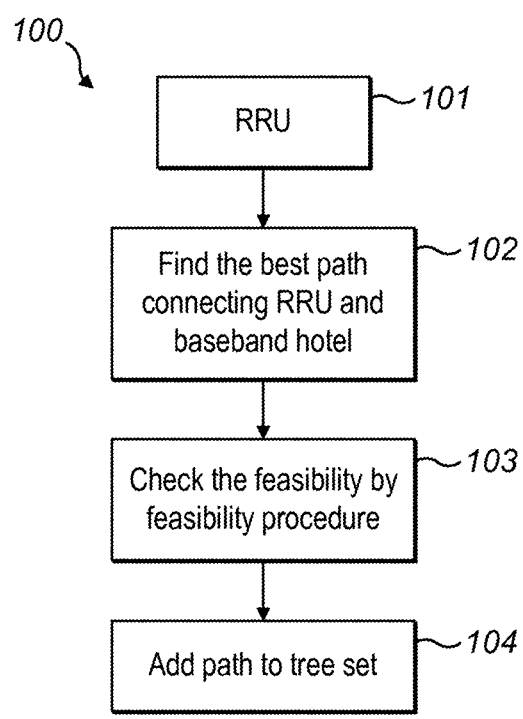
FIG. 5 shows a flowchart illustrating steps according to an example of a part of the invention.

FIG. 5 shows an example method 100 for creating point-to-point connections. The method 100 connects the RRU which cannot be connected to a baseband hotel by a tree. This method is illustrated as step 40 in FIG. 2, or step 71 in FIG. 3. The method calculates the point-to-point connection and checks the feasibility in terms of e.g. constraints providing for a distributed system (e.g. CPRI) and bandwidth constraints.

In 101, one or more RRUs are analysed for point-to-point connections which were not determined to be suitable to be connected in a tree. Q" may be defined as the set of not served original demands from Q in the previous phase. In some examples, the set of RRUs to be analysed for point-to-point connections are ordered according to some criterion (e.g. descending order of requested bandwidth). The point-to-point connections are determined whilst there are remaining unconnected RRUs, i.e. while Q≠0. In some examples, all remaining RRUs not connected in a tree are then connected in point-to-point connections.

In 102, the method 100 determines the best path. The point-to-point connection path may be considered as a tree made on a single path. The path may be defined as from a demand q to d(q), with d(q) a RRU belonging to D. The best path may be considered as having a minimum distance to connect the RRU and baseband hotel. In some examples, this step is computed by a shortest path algorithm (e.g. constrained Dijkstra algorithm) on the residual G.

In 103, the method checks the feasibility of the connection, in terms of connection constraint (e.g. CPRI) and bandwidth constraints, as described in more detail elsewhere in the description. The feasibility of the path (e.g. from q to d(q)) is checked using the feasibility phase. The RRU is removed from the list of further RRUs to be analyzed (e.g. remove q from Q and Q'').

In 104, if the path is feasible, the path is added (as a tree) to the list of calculated trees, i.e. Γ. The method updates the network resources, allocating the required bandwidth from the single RRU.

A tree calculated according to an aspect of the invention is optimized since the calculation computes trees on the basis of connection constraints (e.g. CPRI) in dynamic environment. To optimize the tree, examples try to hang the RRU to existing trees as close to the leafs as possible, in order to maximize the number of RRUs connected to the same DU. For example, the sorting order sorts the more distant and/or with limited network connectivity degree are served as a priority. In some examples, this is followed by considering RRUs supporting more traffic than others.

For any embodiment or aspect, the path computation considers concurrently any two or more of: the network constraints (e.g. topology, DU collocation, physical bandwidth, switch features such as delay), the traffic constraints (e.g. bandwidth), the connection (e.g. CPRI) constraints (e.g. latency, same physical links for up and down connections, round trip delay), or switching constraints.

Figure 6:
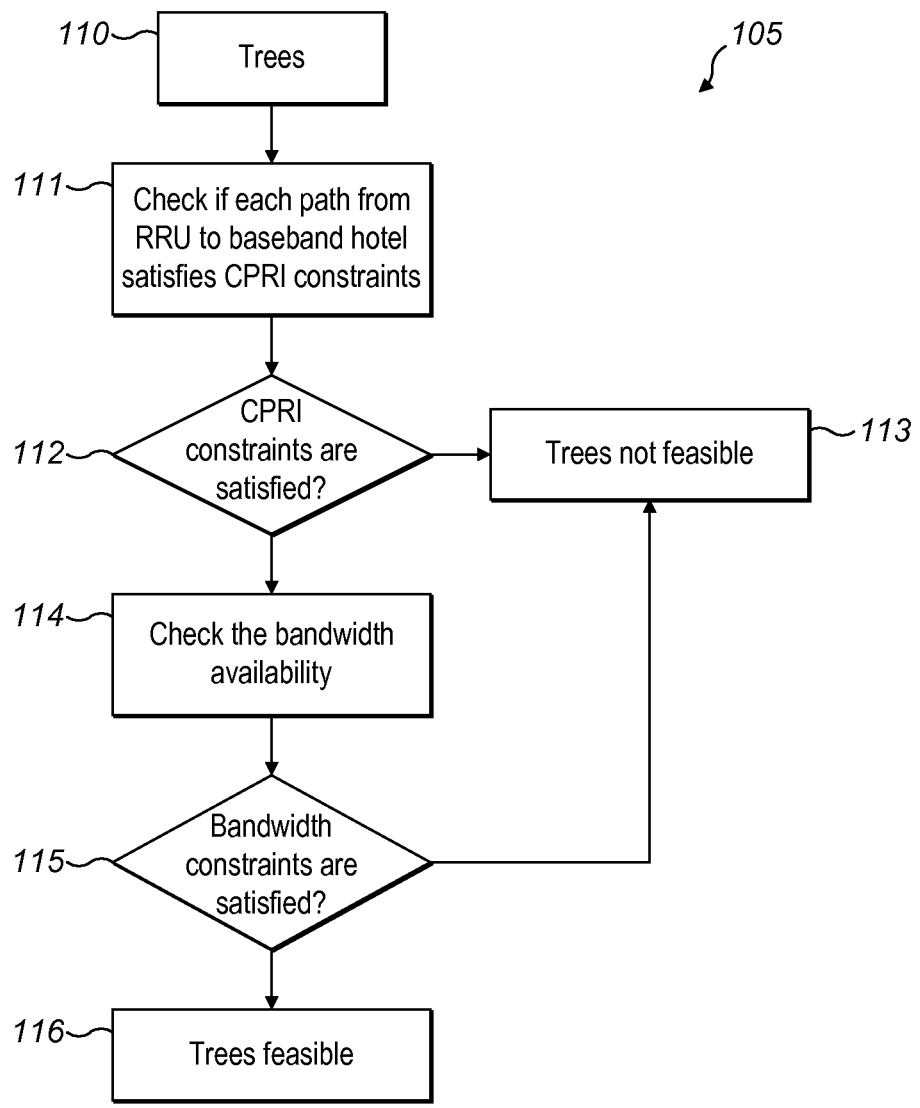
FIG. 6 shows a flowchart illustrating steps according to an example of a part of the invention.

FIG. 6 shows an example method 105 of a feasibility procedure. The feasibility procedure has been described as part of the calculation of trees in step 83 and step 91 (step 52), and in the calculation of point-to-point connections in step 103. The feasibility procedure verifies if the tree (including a point-to-point connection) meets connection requirements between the RRU and baseband hotel (e.g. CPRI) and the bandwidth availability in network links.

Given a tree T and a set of demands Q'''⊂Q, the method 105 verifies whether the set Q''' can be routed on T or not. The leaves of the tree T are all the original sources s(q). For each q belonging to Q'''; from each one of these sources there is a directed path to the destination d(T) belonging to D. The union of these paths defines T. The method 105 comprises receiving 110 the demands from the RRUs and information about the connecting trees.

In 111, the method checks if each path from the RRU to baseband hotel satisfies the connection constraints, e.g. CPRI constraints. The connection constraints may comprise one or more separate constraints.

For example, a first connection constraint is a maximum round trip delay. The first connection constraint limits the maximum distance between the baseband hotel and RRU. A round trip delay is allowed only up to a threshold. The delay is due to the physical distance of the path taken. In some instances, the round trip delay comprises a delay due to handling by a node on the connection. For example, any passed-through active node an extra delay due to electrical processing is taken into account. The processing by the node affects the overall round-trip delay.

The round trip delay may be considered as a time delay, or as an equivalent path length. The delay or path length needs to be less than a threshold to satisfy the connection constraint.

The first constraint n may be considered as, for each q belonging to Q''', checking that the path between RRU and baseband hotel (source to destination), s(q) to d(T), has length less than a fixed threshold.

A second constraint is that a differential delay between the uplink and downlink are less than a threshold value. In some aspects, the second constraint may be considered as that the uplink and downlink of the same stream follows a common optical path. Thus, the uplink and downlink between an RRU and baseband hotel are along the same path.

One or more further constraints may be included in the feasibility procedure. For example, latency may be considered as a further parameter. The latency needs to be below a threshold value for the path to be selected. The one or more constraints are imposed by the protocol that connects the RRUs and baseband hotels.

The method determines in 112 if the connection constraint (s) are satisfied. If they are not all satisfied, the tree is determined not to be feasible in 113. If the connection constraint(s) are all satisfied, the method continues by checking the bandwidth availability 114. The method determines if the required bandwidth from all the RRUs connected by the tree is available on the network links. The method check that each link of T satisfies the bandwidth constraints.

The method determines in 115 if the bandwidth constraint is satisfied. If it is not satisfied, the tree is again determined not to be feasible in 113.

If the bandwidth constraint is determined to be satisfied, the method determines that the tree is feasible in 116. This determination of feasibility is used as part of the overall method to determine the optimal network configuration between RRUs and baseband hotel.

The method 105 describes the connection constraint(s) being determined before the bandwidth constraint. Alternatively, the connection constraint(s) is determined before or in parallel with the bandwidth constraint.

Aspects of the invention calculating the network routing may be carried out at pre-determined time intervals, at particular times (e.g. of the day or week), or in response to a trigger (e.g. traffic approaching a threshold value). Aspects of the invention may be carried out in case of a failure of one or more links or nodes. The same method and procedures apply. One or more RRU(s) impacted by the failure can be connected to the same or a different baseband hotel according to the available connectivity.

In some examples, the method is configured to:
1. Connect the impacted RRU(s) to the same DU.
2. Connect the impacted RRU(s) to a different baseband hotel by increasing an existing tree.
3. Connect the RRU(s) to a different baseband hotel by a new tree.

These options are applicable to any embodiment of the invention. These three options may be considered in a particular order (e.g. 1-2-3), or all considered to determine the optimal configuration.

Figure 7:
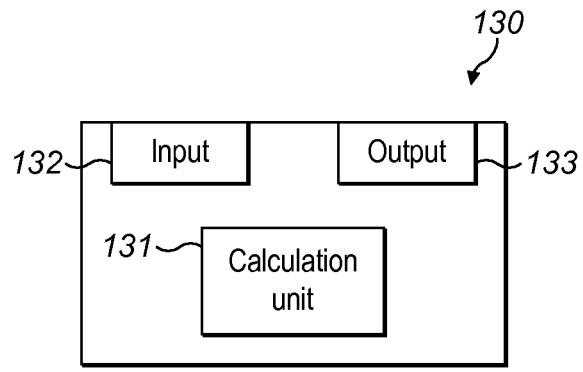
FIG. 7 shows an apparatus according to an example of the invention.

FIG. 7 shows an example apparatus 130 arranged to carry out the functions of the method described above. The apparatus 130 comprises a calculation unit 131. The calculation unit 131 may be implemented using one or more processing units, and optionally, data storage. The apparatus 130 comprises an input interface 132 for receiving information of the bandwidth requirements of the RRUs, and optionally further information, e.g. status of the nodes or links or current connections.

The apparatus 130 may further comprise an output interface 133 for outputting the calculated network configuration. The apparatus 130 may output the configuration to the network nodes, or to another system which communicates with the nodes.

Aspects of the present invention may comprise a computer program or computer program product, configured to run on a computer or processing unit, to carry out at least some of the functions described. The computer program may run on the processing unit of the apparatus 130. In some examples, the apparatus 130 may be implemented in a network node, management system, or in any apparatus connected to the network.

Figure 8:
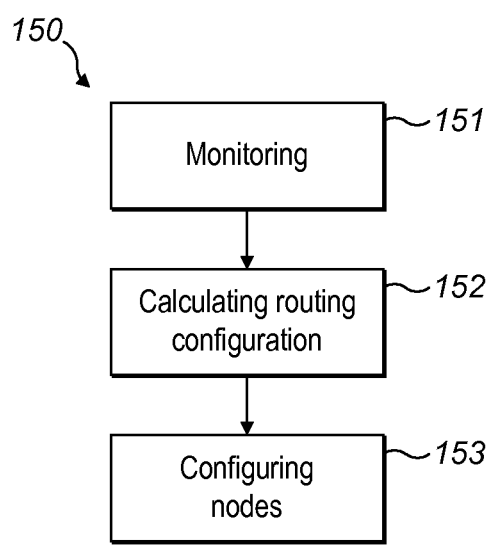
FIG. 8 shows a further flowchart illustrating steps according to an example of the invention.

Examples of the invention may be implemented in any node, server, network management system (NMS) or Software-defined networking (SDN) controller. Examples of the invention may be implemented as a library or an application. FIG. 8 shows an example method 150 of a further aspect of the invention. The method 150 comprises monitoring 151 a bandwidth demand of each Remote Radio Unit. The monitoring may comprise receiving information from the Remote Radio Unit, monitoring the Remote Radio Unit or baseband hotel, or otherwise determining the bandwidth demand. In some examples, the monitoring may also comprise retrieving or obtaining further information on the RRUs and/or baseband hotels needed to perform the calculations described.

In 152, the method calculates a routing configuration of the nodes to connect at least one Remote Radio Unit on a tree arrangement to a said Baseband hotel (Baseband Unit), as described above. The calculating the routing configuration is based on at least one connection requirement between the Remote Radio Units and the Baseband hotels and the bandwidth demand of each Remote Radio Unit. In some examples, the calculating also comprises calculating a point-to-point connection. For example, a point-to-point connection is calculated for any RRUs which are not possible, or not desired, to be placed in a tree arrangement.

In 153, the method configures one or more optical network nodes to adapt the routing configuration from a said Remote Radio Unit to a said Baseband hotel, according to the calculated routing configuration. The configuring is carried out dynamically. The configuring may be at intervals or in response to a detected change. The (re)configuring of the optical network nodes is carried out according to the type of network, in a known manner.

In some examples, the calculation of examples of the invention connects adjacent radio units to the same baseband hotel/digital unit, in order to be able to co-process signals in the latter. The tree-driven algorithm of examples of the invention is applicable to achieve as common routing as possible of signals from these adjacent radio units. The criterion to aggregate may be a parameter in the calculation of the topology. Examples of the invention also work for a physical ring structures.

The network may further include multiplexers in order to aggregate traffic to/from adjacent remote radio units. The multiplexers may be close to the access network. The network may also analyze cascading remote radio units (e.g. in a daisy chain) before connecting them to the baseband hotel.

Aspects of the invention provide for optimization of the resource usage in terms of bandwidth assignment. Examples of the invention provide dynamic reconfiguration of the network resources, e.g. for predictable traffic change. Examples of the invention may be used for the support of recovery. Instances of the invention provide a centralization of the path computation function. A network configured according to the examples of the invention may provide a well-balanced loading of front-haul and backhaul network. Aspects of the invention may allow a reduction in the overprovisioning of the network.

Aspects of the present invention provide a centralized RBS architecture that allows one or more of: node consolidation, a reduction of infrastructure and operational costs, a more efficient usage of the radio spectrum, an easier adjacent cells information correlation and throughput growth to the final users.

In some examples, the method and apparatus according to aspect of the invention may calculate a new routing and bandwidth assignment, and pass the information to another apparatus to configure the network nodes. In some examples, the method may not be considered as dynamically reconfiguring the network nodes. The monitoring of the bandwidth demand may not be carried out by the same apparatus as the calculation unit determining the routing and bandwidth assignment.

One or more functions of the apparatus or steps of the method may be performed at a separate apparatus or a separate time. Any aspect of any embodiment may be combined with any feature of any other embodiment.

The invention claimed is:

1. A method of configuring optical network nodes between a plurality of Remote Radio Units and at least one Baseband Unit, comprising:
   monitoring a bandwidth demand of each Remote Radio Unit,
   calculating a routing configuration of the nodes to connect at least one Remote Radio Unit on a tree arrangement to a said Baseband Unit,
   wherein the calculating the routing configuration is based on at least one connection requirement between the Remote Radio Units and the Baseband Units and the bandwidth demand of each Remote Radio Unit, and
   dynamically configuring one or more optical network nodes to adapt the routing configuration from a said Remote Radio Unit to a said Baseband Unit, according to the calculated routing configuration;
   wherein calculating the routing configuration comprises initially calculating a connection of a said Remote Radio Unit in a tree arrangement, and if the tree arrangement is not determined to meet at least the traffic demand and connection requirement, then calculating the routing configuration as a point-to-point connection to a said Baseband Unit.

2. The method as claimed in claim 1 wherein calculating the routing configuration comprises determining that one or more Remote Radio Units are connected with a point-to-point connection to a said Baseband Unit, and not as part of a said tree arrangement.

3. The method as claimed in claim 1, wherein the at least one connection requirement is one or more requirements of: latency, round-trip delay, differential delay between upstream and downstream paths, and same physical link for upstream and downstream connections.

4. The method as claimed in claim 1 wherein the calculating analyzes both creating a new tree arrangement for a pair of Remote Radio Units and augmenting a tree arrangement with a Remote Radio Unit.

5. The method as claimed in claim 1, wherein the calculating determines whether a connection of a Remote Radio Unit meets the at least one connection requirement and the bandwidth demand for each node of a tree, prior to a selection of the node of the tree to route the connection of the Remote Radio Unit.

6. The method as claimed in claim 1, wherein the calculating comprises analysing a plurality of routing configurations from a Remote Radio Unit to each network node of a tree arrangement to which the Remote Radio Unit may connect, and selecting the optimal routing configuration from an Remote Radio Unit to each network node of a tree arrangement.

7. The method as claimed in claim 1, wherein the optimal routing configurations from an Remote Radio Unit to each network node of a tree arrangement is selected prior to determining whether a connection of a Remote Radio Unit meets the at least one connection requirement and the bandwidth demand for each node of the tree.

8. The method as claimed in claim 1, wherein one or more of the optical network nodes is a reconfigurable optical add-drop multiplexer (ROADM).

9. The method as claimed in claim 1, wherein the calculating comprises ordering a plurality of Remote Radio Units to be connected to the same Baseband Unit, wherein the ordering priorities Remote Radio Units which are more distant and/or Remote Radio Units with less possible connections, and determining a routing configuration for the Remote Radio Units in the determined order.

10. An apparatus arranged to determine a configuration of optical network nodes between a plurality of Remote Radio Units and at least one Baseband Unit, comprising:
    an input interface arranged to receive monitoring information of a bandwidth demand of each Remote Radio Unit,
    one or more processors configured to calculate a routing configuration of the nodes to connect at least one Remote Radio Unit on a tree arrangement to a said Baseband Unit,
    wherein the one or more processors are configured to calculate the arrangement based on at least one connection requirement between the Remote Radio Units and the Baseband Units and the bandwidth demand of each Remote Radio Unit, and
    an output interface arranged to output the calculated configuration to dynamically configure one or more optical network nodes to adapt the routing from a said Remote Radio Unit to a said Baseband Unit;
    wherein the one or more processors are configured to calculate the routing configuration by initially calculating a connection of a said Remote Radio Unit in a tree arrangement, and if the tree arrangement is not determined to meet at least the traffic demand and connection requirement, then calculating the routing configuration as a point-to-point connection to a said Baseband Unit.

11. The apparatus as claimed in claim 10 wherein the one or more processors are configured to calculate the routing configuration with one or more Remote Radio Units connected with a point-to-point connection to a said Baseband Unit, and not as part of a said tree arrangement.

12. The apparatus as claimed in claim 10, wherein the one or more processors are configured to calculate the routing configuration based on at least one connection requirement of: latency, round-trip delay, differential delay between upstream and downstream paths and same physical link for upstream and downstream connections.

13. The apparatus as claimed in claim 10, wherein one or more of the optical network nodes is a reconfigurable optical add-drop multiplexer (ROADM).

14. A non-transitory computer readable medium configured, when run on a computer, to conduct a method according to claim 1.

* * * * *